US009485603B2

(12) United States Patent
Worrall et al.

(10) Patent No.: US 9,485,603 B2
(45) Date of Patent: Nov. 1, 2016

(54) CUSTOMIZABLE BEACONS TO ACTIVATE CONTENT ON A USER DEVICE

(71) Applicant: Disney Enterprises, Inc., Burbank, CA (US)

(72) Inventors: John David Worrall, Clermont, FL (US); David Alexander Francus, Orlando, FL (US); Gregory Gerard Johnson, Windermere, FL (US); Peter Stepniewicz, Winter Garden, FL (US); Jeffrey Robert Schenck, Clermont, FL (US); Thomas Carey Arthur, Brooklyn, NY (US)

(73) Assignee: Disney Enterprises, Inc., Burbank, CA (US)

( * ) Notice: Subject to any disclaimer, the term of this patent is extended or adjusted under 35 U.S.C. 154(b) by 9 days.

(21) Appl. No.: 14/540,148

(22) Filed: Nov. 13, 2014

(65) Prior Publication Data

US 2016/0142856 A1    May 19, 2016

(51) Int. Cl.
*H04B 1/00* (2006.01)
*H04W 4/00* (2009.01)
*H04W 4/02* (2009.01)

(52) U.S. Cl.
CPC ............. *H04W 4/003* (2013.01); *H04W 4/008* (2013.01); *H04W 4/021* (2013.01)

(58) Field of Classification Search
CPC ..... H04W 4/04; H04W 4/008; H04B 5/0031
See application file for complete search history.

(56) References Cited

U.S. PATENT DOCUMENTS

| 8,396,485 | B2 | 3/2013 | Grainger et al. |
| 8,483,714 | B2 | 7/2013 | Agardh et al. |
| 2013/0065584 | A1 | 3/2013 | Lyon et al. |
| 2013/0225197 | A1 | 8/2013 | McGregor et al. |
| 2014/0087752 | A1 | 3/2014 | Zhu et al. |
| 2015/0382150 | A1* | 12/2015 | Ansermet ............... H04W 4/04 455/41.1 |

FOREIGN PATENT DOCUMENTS

EP    2631665 A2    8/2013

OTHER PUBLICATIONS

Company Identifiers, Bluetooth: Special Interest Group, 2014, Bluetooth SIG, Inc., <https://www.bluetooth.org/en-us/specification/assigned-numbers/company-identifiers>.

* cited by examiner

*Primary Examiner* — Charles Appiah
*Assistant Examiner* — Randy Peaches
(74) *Attorney, Agent, or Firm* — Patterson + Sheridan LLP

(57) ABSTRACT

Embodiments described herein use customized beacons embedded in Bluetooth low-energy advertisements to transmit information between a user device and a beacon module. In one embodiment, the beacon module transmits the advertisement to the user device. The user device then parses the data contained within the advertisement to identify a customized beacon. Based on the information contained in the beacon, the application may provide an audio and/or visual presentation to the user. For example, the beacon may inform the user device that it is within close proximity to a particular geographic location (e.g., a point of interest). In response, the beacon application may present a visual presentation about the geographic location using a display screen within the user device.

21 Claims, 11 Drawing Sheets

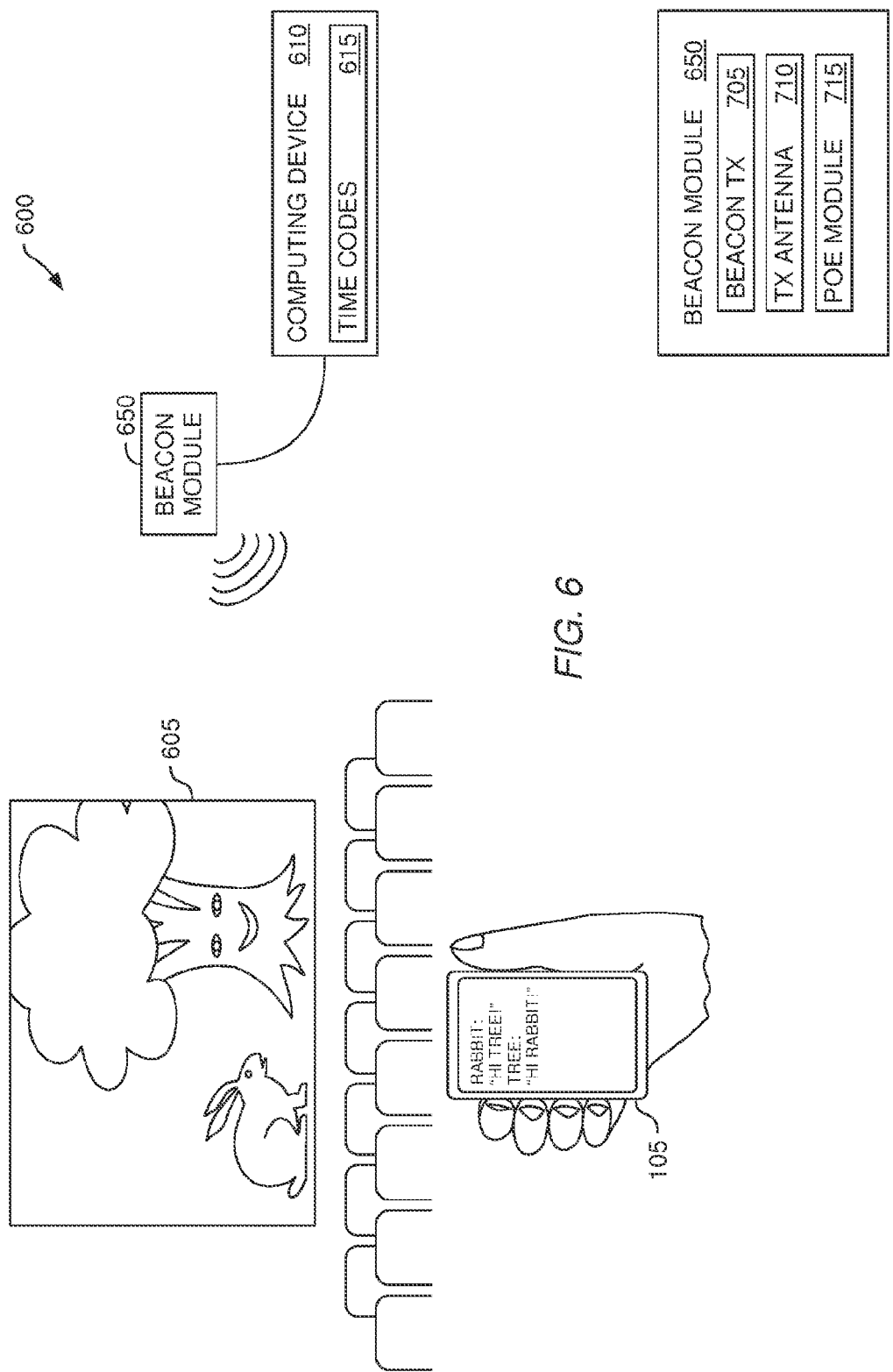

CUSTOMIZABLE BEACONS TO ACTIVATE CONTENT ON A USER DEVICE

BACKGROUND

1. Field of the Invention

Embodiments presented in this disclosure generally relate to beacons with customized payloads, and more specifically, to embedding the customized beacon into advertisements in order to trigger a predefined response in a user device.

2. Description of the Related Art

Infrared communication systems are known to provide accurate location information that a user device can use to activate user content (e.g., displaying a map, providing an audio or visual presentation specific to the location, and the like). To do so, an IR transmitter may transmit location data to the user device which, in turn, uses the location data to identify its current location. Based on identifying its location, the user device can provide location specific content to the user, thereby enhancing the user's experience.

One disadvantage of using infrared communication is that the user devices require special hardware that enable infrared communication. For example, if a theme park operator wants to use infrared communication to enhance a guest's experiences, the operator must provide the guest with a user device that is IR enabled. But purchasing, maintaining, and updating IR enabled devices is expensive. With the recent proliferation of handheld or portable computing devices such as smartphones and tablets which permit the user to load customized applications onto the devices, if the location information could instead be transmitted using a communication method supported by these common devices (which IR communication is typically not) then the operator no longer has to provide the guest with the user device. The location information can instead be transmitted using a communication method supported by the guest's personal device.

SUMMARY

Embodiments presented herein include a communication system that includes a beacon module comprising an antenna and beacon transmitter. The beacon transmitter is configured to transmit a Bluetooth LE advertisement containing a customized beacon using the antenna. The customized beacon includes (i) a data field indicating a formatting used in a payload portion of the customized beacon and (ii) dynamic payload data in the payload portion comprising data that is relevant to a current context of the beacon module where a value of the data field varies to indicate a type of dynamic payload data included in the customized beacon. The communication system also includes a user device configured to receive the Bluetooth LE advertisement, the user device containing a beacon application configured to instruct the user device to output a presentation based on the payload data.

Another embodiment includes a beacon module that includes an antenna and a beacon transmitter configured to transmit a customized beacon an external application. The customized beacon including (i) a data field indicating a formatting used in a payload portion of the customized and (ii) dynamic payload data in the payload portion comprising data that is relevant to a current context of the beacon module where a value of the data field varies to indicate a type of dynamic payload data included in the customized beacon. Moreover, the beacon transmitter is configured to transmit the customized beacon using a communication protocol that transmits data at one or more radio frequencies greater than 1.5 GHz, wherein the communication protocol does not require pairing between the beacon transmitter and a user device receiving the beacon.

Another embodiment includes a method of generating a customized beacon comprising at least (i) a data field indicating a formatting used in a payload portion of the customized beacon and (ii) dynamic payload data in the payload portion comprising data that is relevant to a current context of the beacon module where a value of the data field varies to indicate a type of dynamic payload data included in the customized beacon. The method also includes broadcasting the customized beacon to a user device executing the application using a communication protocol that transmits data at one or more radio frequencies greater than 1.5 GHz, where the communication protocol does not require pairing between the beacon transmitter and the user device.

Another embodiment includes a communication system with a beacon module comprising an antenna and beacon transmitter where the beacon transmitter is configured to transmit, via the antenna, a Bluetooth LE advertisement containing a customized beacon. The customized beacon includes at least (i) a data field indicating a formatting used in a payload portion of the customized beacon and (ii) dynamic payload data in the payload portion comprising data that is relevant to a current context of the beacon module, where a value of the data field varies to indicate a type of dynamic payload data included in the customized beacon. The communication system also includes an application configured to execute on a user device and is configured to receive the Bluetooth LE advertisement and instruct the user device to output a presentation based on the payload data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 6 illustrates a communication system with a beacon module communicatively coupled to a computing device, according to embodiments described herein.

FIG. 7 illustrates a beacon module with a secondary communication system used to communicate with an external computing device, according to one embodiment described herein.

Figure 1:
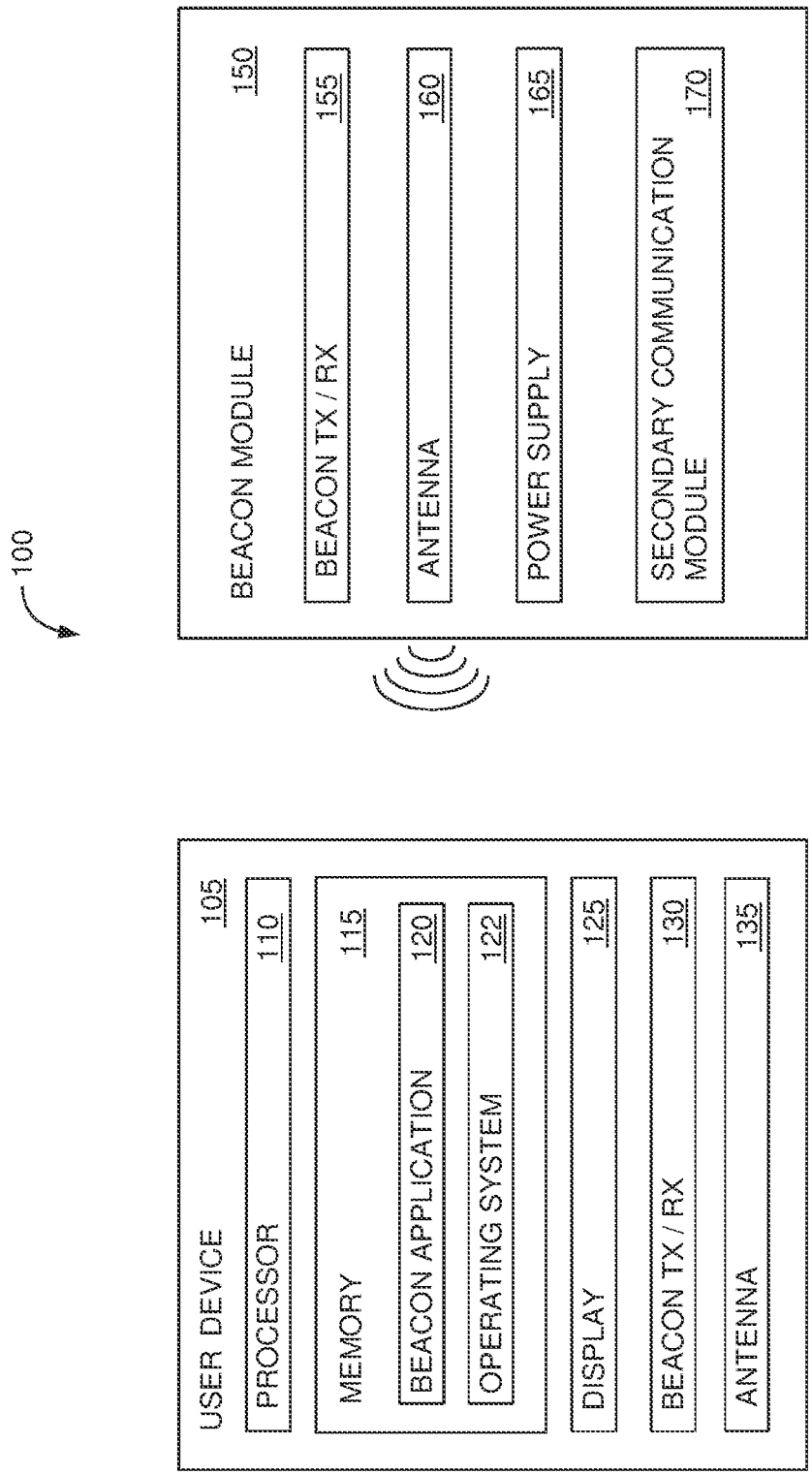
FIG. 1 illustrates a communication system that uses Bluetooth LE advertisements, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments described herein use customized beacons embedded in, for example, Bluetooth® low energy (LE) advertisements (also referred to as Bluetooth Smart® to transmit location information between a beacon module and a user device (Bluetooth® and Bluetooth Smart® are registered trademarks of Bluetooth SIG). In one embodiment, the beacon module transmits the Bluetooth LE advertisement to the user device. Sometime prior to receiving the advertisement, the user may have installed a beacon application onto the user device which enables the user device to decode the advertisement. The application then parses the data contained within the advertisement to identify a customized beacon. Based on the information contained in the beacon, the application may provide an audio and/or visual presentation to the user. For example, the beacon may inform the user device that it is within close proximity to a particular geographic location (e.g., a point of interest). In response, the beacon application may present a visual presentation about the geographic location using a display screen within the user device.

In one embodiment, the user device and beacon module may perform bidirectional communication. For example, the beacon module may transmit the Bluetooth LE advertisements to the user device and the user device may respond with different Bluetooth LE advertisements (or use a different communication technique such as WiFi). Moreover, the beacon module may be coupled to an external computing device that provides supplemental data which the beacon module forwards to the user device. For example, the external computing device may transmit a timestamp which the beacon module embeds into a beacon and transmits to the user device. Alternatively or additionally, the beacon module may forward information received from the user device to the external computing device which in turn may alter the environment based on the user feedback. For example, the user device may use a Bluetooth LE advertisement to inform the beacon module that the users are young children rather than adults. As such, once the external computing device receives this information from the beacon module, the computing device may change the physical environment of a theme park ride to be less scary or more age appropriate.

In one embodiment, the Bluetooth LE advertisement may contain multiple beacons that are recognized by different applications. For example, certain operating systems (OS) are configured to accept beacons with specific formats. These OS specific beacons, however, may not have the ability to enable all the desired features or functions. As such, the beacon modules may generate Bluetooth LE advertisements that contain both the OS specific beacons and the customize beacons discussed above that enable an application on the user device to provide the user with an enhanced experience. This dual-mode operation means that a communication system can benefit from the features offered by both types of beacons—i.e., the OS specific beacons and the customized beacons.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a communication system 100 that uses Bluetooth LE advertisements, according to one embodiment described herein. The system 100 includes a user device 105 and a beacon module 150. In one embodiment, the user device 105 is any portable or handheld computing device such as a smartphone, tablet, and the like. As an example, the user device 105 may include a battery to increase the mobility of the device 105.

As shown, the user device 105 includes a processor 110, memory 115, display 125, beacon transmitter and/or receiver (TX/RX) 130 and antenna 135. The processor 110 represents any number of processors which each can include one or more processing cores. The memory 115 may include volatile memory (e.g., DRAM), non-volatile memory (e.g., Flash memory), or combinations thereof. Memory 115 includes a beacon application 120 and an OS 122. The beacon application 120 may use the data encapsulated in beacons within a Bluetooth LE advertisement to output an audio and/or visual presentation to the user. The details of the beacons and how the data carried in the beacons may be used by the application 120 will be described in more detail below.

The display 125 may be an integrated display or may be housed in a separate component or enclosure. For example, the processor 110 and memory 115 may be located within one enclosure that is then communicatively coupled to a second enclosure that includes the display 125. Similarly, the beacon TX/RX 130 and antenna 135 may be integrated into the same enclosure with the rest of the components in the user device 105 or located within a separate enclosure.

The beacon TX/RX 130 may be hardware, firmware, software, or combinations thereof and is coupled to the antenna 135 to receive and/or transmit Bluetooth LE advertisements. In one embodiment, the beacon TX/RX 130 is only a receiver and is configured to receive, but not transmit, Bluetooth LE advertisements. In another embodiment, the beacon TX/RX 130 is only a transmitter that is configured to transmit, but not receive, Bluetooth LE advertisements. However, in one embodiment, the beacon TX/RX 130 is a transceiver that is configured to both transmit and receive Bluetooth LE advertisements.

The beacon module 150 includes a beacon TX/RX 155, antenna 160, power supply 165, and secondary communication module 170. Like the beacon TX/RX 130 on the user device 105, in various embodiments, the beacon TX/RX 155 may only transmit, only receive, or both transmit and receive Bluetooth LE advertisements using antenna 160. Moreover, the antenna 160 may be designed or orientated to provide a desired radiation pattern when used to transmit advertisements. For example, the antenna may be shaped such that the radiation pattern is limited to the boundaries of a room. In addition to shaping the antenna 160, the power of the antenna 160 may be controlled to generate the desired radiation pattern. For instance, to limit the radiation pattern to the boundaries of a room, an attenuator may be coupled to the antenna 160 to limit its output power. Power attenuation may be necessary because, unlike infrared sources, solid walls do not necessarily stop Bluetooth LE signals. As such, if power is not controlled, the beacon module 150 may broadcast beacons that inform a recipient that it is in Room A which can also be received by user devices in Room B, thereby providing false location information to these devices.

While Bluetooth LE advertisements are specifically discussed in the embodiments herein, this disclosure is not limited to such. For example, other present or future communication techniques which are capable of providing location information to the user devices based on predefined radiation patterns may also be used. In one embodiment, the communication protocol used to transmit the beacons uses a frequency range that is around the 2.4 GHz ISM band which enables long range communication (e.g., greater than 1 foot). In one embodiment, the frequencies used by communication protocol are greater than 1.5 GHz which excludes, for example, RFID communication protocols which use frequencies less than 930 MHz. In another example, the frequencies of the communication protocol range between 1.5 GHz and 3.5 GHz. In one embodiment, the frequencies of the communication protocol are radio frequencies (e.g., between 3 kHz and 300 GHz) thereby excluding communication protocols that rely on infrared, visible, ultra-violate, and other higher frequency signals to transmit data. Moreover, the communication protocol may be able to communicate reliably without requiring line-of-sight (LOS) in contrast to infrared and visible light communication protocols. Furthermore, in one embodiment, the communication protocol used to transmit the beacons does not require pairing between the beacon transmitter/receiver 155 and the user device 105. For example, protocols such as WiFi, Bluetooth, and ZigBee require various pairing operations or handshaking to occur between two devices before a communication channel is established. In contrast, a communication protocol like Bluetooth LE broadcasts beacons that contain instructional data (in contrast to configuration data for performing pairing) without first discovering and pairing with a receiving device. These broadcasts can be received and interpreted by multiple user devices in contrast to, e.g., WiFi, Bluetooth, and ZigBee which transmit instructional data intended for specific devices that have already been paired with the transmitter. Further still, an operating system executing the communication protocol on a receiving device may have access to the data transmitted by these broadcasts.

The power supply 165 may be a battery, an AC-DC power supply, a DC-DC power supply, Power over Ethernet (POE) and the like. For example, to make the beacon module 150 portable, a battery may be used as a power supply 165. An enclosure may then be attached to a mobile object (e.g., a character roaming throughout a theme park). In one embodiment, using lithium thionyl chloride C-cell batteries may permit the beacon module 150 to transmit the Bluetooth LE advertisements for up to 8 years without having to replace the batteries.

The secondary communication module 170 represents any communication that is not done using Bluetooth LE advertisements. For example, the secondary communication module may use a wireless or wired communication technique to communicate with an external computing device or network—e.g., WiFi, Ethernet, regular Bluetooth, USB, and the like. In another example, the secondary communication module 170 may be used to communicate with the user device 105 using a different technique than Bluetooth LE advertisements. For example, after receiving the advertisement, the user device 105 may transmit a reply message to the secondary communication module 170 using, for example, regular Bluetooth or WiFi.

Figure 2:
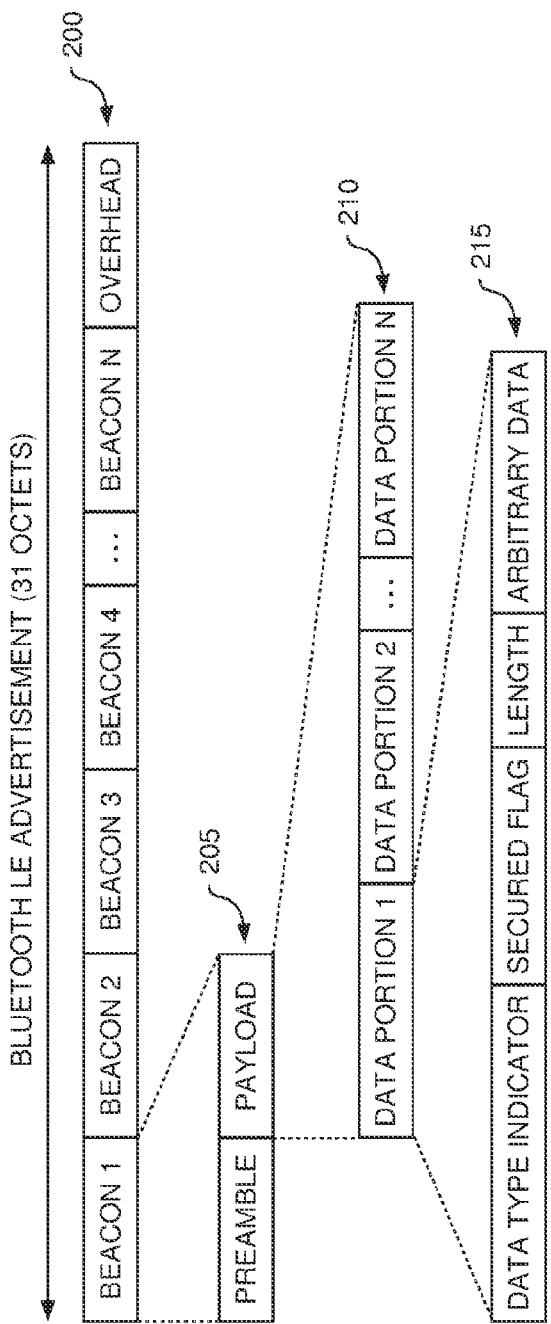
FIG. 2 illustrates data portions of a customized Bluetooth LE advertisement, according to embodiments described herein.

FIG. 2 illustrates data portions of a customized Bluetooth LE advertisement 200, according to embodiments described herein. As shown, the advertisement 200 includes a plurality of different beacons. In one embodiment, each of the beacons may be the same type of beacon. However, in another embodiment, the advertisements 200 may include multiple types of beacons. As used herein, a "beacon type" refers to how data is formatted within the beacon. For example, one beacon type may put location information at certain portions of the beacon while a second beacon type may put the location information at different locations in the beacon. By knowing the beacon type, an application receiving the beacon is able to decode the data contained within the beacon. For instance, the application evaluates a certain predetermined portion of the payload of the beacon (e.g., bytes 30-38) to identify location information but evaluates a different predetermined portion of the payload (e.g., byes 39-42) to identify a time stamp. Without knowing the type of the beacon (i.e., how the data is formatted and what the data represents), the receiving beacon application is unable to decode the data into usable information. Although not shown, the Bluetooth LE advertisement 200 may include other information such as a preamble, access address, advertising header, payload length value, error detection codes, and the like.

As mentioned above, some OSs are configured to recognize a specific beacon type. For example, iOS made by Apple® uses a special Bluetooth LE iBeacon™ (Apple and iBeacon are registered trademarks of Apple, Inc. in the US and many other jurisdictions). iBeacon is a beacon type that is recognized by user devices executing iOS or, more generally, devices that support Bluetooth LE. However, iBeacon may be inadequate for certain types of applications. For example, the payload of an iBeacon provides two data field locations for providing location information: a major portion and a minor portion. The major portion may specify a general location (e.g., a particular store, theme park attraction, floor of a building) while the minor portion specifies a location within the general location (e.g., the shoe department of the store, a room in the attraction, or an office on the floor). However, for some applications, this may not provide location information with enough granularity. In addition, the iBeacon is emitted only once per second which means the location information in the beacons may quickly become inaccurate when the user device is moving rapidly. Further still, an operator may want to provide other types of information using the beacon such as a time stamp, but the iBeacon format does not allocate space for providing such data.

In one embodiment, the advertisement 200 may include multiple types of beacons. For example, Beacon 1 in advertisement 200 may be a customized beacon (referred to herein as a "D-beacon") while Beacon 2 is an iBeacon (e.g., a beacon recognized by the particular OS executing on the user device). In one embodiment, the D-beacon may not be recognized by the OS—i.e., the OS by itself is unable to interpret the data in the D-beacon. That is, because the data in the D-beacon is formatted differently than the OS specific beacon, the OS may be unable to decode or interpret the data within the D-beacon without the user loading an additional application onto the user device. As discussed in FIG. 1, the user can load the beacon application 120 onto the user device 105 which is able interpret the specific data format of the D-beacon.

One advantage for transmitting both the D-beacons and the OS specific beacons is that OS specific beacons may be able to perform some functions that the D-beacons are unable to do. For example, when hibernating, iOS still maintains enough functionality to detect the receipt of an iBeacon. Thus, the iBeacon can wake up the iOS which then begins executing the beacon application which, in turn, interprets the D-beacons that would otherwise be ignored if the iOS remained in hibernation.

Assuming Beacon 1 is a D-beacon, this beacon 205 includes a preamble and payload. The preamble may include such information as the length of the beacon 205, prefix information, and the like. Moreover, the payload 210 is divided into a plurality of different data portions where the total length of the payload 210 is the difference between the total length of the beacon (e.g., Beacon 1) and the length of the preamble. In one embodiment, the lengths of the data portions are flexible, and thus, the number of data portions in the payload 210 can vary. Furthermore, the format of the data within these data portions may be the same or vary. For example, Data Portion 1 may provide both location information and scene information corresponding to a visual presentation, while Data Portion 2 provides only a time stamp. As such, each data portion 215 may include a data type indicator which is a data field that informs the beacon application how to interpret the data that follows. In one embodiment, the data type indicator informs the application how the data in the arbitrary data section of the data portion 215 is formatted and what the data represents. Continuing the previous example, based on the data type indicator, the beacon application determines that in Data Portion 1 the first byte of the arbitrary data section contains location information and the second byte contains the current scene of a video presentation playing near the user. Alternatively, for Data Portion 2, the data type indicator informs the beacon application that both bytes of the arbitrary data section are used to provide a time stamp. In this manner, the beacon application can be pre-configured to associate different values of the data type indicator with respective formats of the arbitrary data section, and thus, decode the data stored in this section.

Generally, the data type indicator provides a context of the beacon which may include the time of day, time of year, location of the beacon module, events occurring in the vicinity of the beacon module, special merchandises or marketing promotions being offered by the operator of the beacon module, holidays, languages spoken in the vicinity of the beacon module, food and beverage menu offerings offered by the operator of the beacon module, immersive entertainment offerings provided by the operator of the beacon module, game scores and content of a game associated with the beacon module, timing or scene of a theatrical show, film or ride information occurring near the beacon module, and the like.

In one embodiment, the length data field shown in data portion 215 is used to reduce unnecessary processing of D-beacon data packets which are not of interest to the application receiving the D-beacon. As described above, the D-beacon packet format is designed to carry multiple custom payloads. After reading the data field indicator and determining that the payload type is not relevant, the application can use the length data field, which indicates the number of octects in the arbitrary data, to skip over the information in the arbitrary data field, thereby reducing processing time. Stated differently, if the packet is not relevant, the application uses the length indicator to avoid processing the arbitrary data and skip directly to the next data portion.

The data portion 215 also includes a secured flag which may be used to secure the transmission of the D-beacon. In one embodiment, the secured flag indicates that security protocol is being used. For example, a one-way public-private key combination may be used to prevent a user from unlocking features in the beacon application without the user first being required to be within range of the beacon module transmitting the appropriate D-beacon. In one embodiment, any remaining (i.e., extra) available bytes in the advertisement 200 contain a concatenation of a secret key, encrypted content, and a counter. The value of the secret key is known only a certain entity which verifies the authenticity of the packet. Using the remaining bytes of the advertisement to contain this concatenation can extend the length of the hash and improves security.

Figure 3:
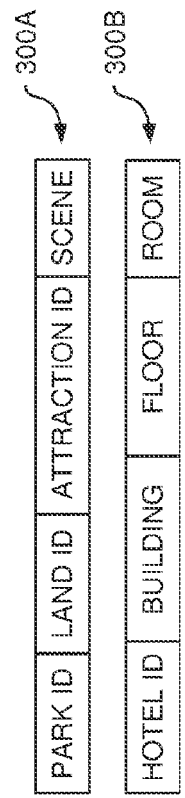
FIG. 3 illustrates different types of beacons within a Bluetooth LE advertisement, according to one embodiment described herein.

FIG. 3 illustrates different example formats of a D-beacon within a Bluetooth LE advertisement, according to one embodiment described herein. Specifically, FIG. 3 illustrates two different payloads 300 that are organized in two different formats. Payload 300A includes a section used to indicate the particular park a user is in. For example, a theme park may have multiple distinct parks such as Magic Kingdom®, Epcot®, Disney's Animal Kingdom®, and Disney's Hollywood Studios® which are all part of Walt Disney World® (and are registered trademarks of Disney Enterprises, Inc. in the US and many other jurisdictions). Each of these parks may be divided into multiple lands, and thus, the land ID section identifies which land the user device is currently at. Furthermore, each land may have multiple attractions in which case the payload 300A includes a predefined section (i.e., the attraction ID) for indicating which attraction the user device is currently located. Furthermore, the payload 300A includes portion for indicating the scene information of any visual or audio presentation that may be playing at the particular attraction. For example, assuming the beacon application provides the user with subtitles that correspond to video presentations at the various attractions, if the user arrives at an attraction while the video presentation has already been playing, using the scene information from payload 300A, the beacon application can skip ahead to the appropriate subtitles.

As shown by payload 300A, the D-beacon may provide more granular location information than would be possible using only an iBeacon which includes only major and minor data sections. Furthermore, payload 300A provides the scene information which can be used to synch the user device to an audio or visual presentation (e.g., a movie or animatronics show) occurring at the scene.

Payload 300B is formatted differently than payload 300A, and thus, would have a different data type indicator value than payload 300A. Payload 300B includes predefined sections for placing a hotel ID, building number (assuming the hotel has more than one building), floor number, and room number. For example, individual room in the hotel may have a separate beacon modules that broadcast a Bluetooth LE advertisement that include payload 300B. Once the user device moves inside the room and receives the advertisements, based on the information in payload 300B, the beacon application can identify its location and provide audio or visual presentation that corresponds to that location. For example, the beacon application may cause the display of the user device to play a video explaining the features of the room.

Payloads 300A and 300B are only two examples of different payloads a D-beacon may contain. By using a preconfigured beacon application, any number of different payloads for different purposes may be received and decoded by the user device. For example, if a different type of payload is desired, an update for the beacon application may be pushed out to inform the beacon application of the format of the new payload.

Figure 4A:
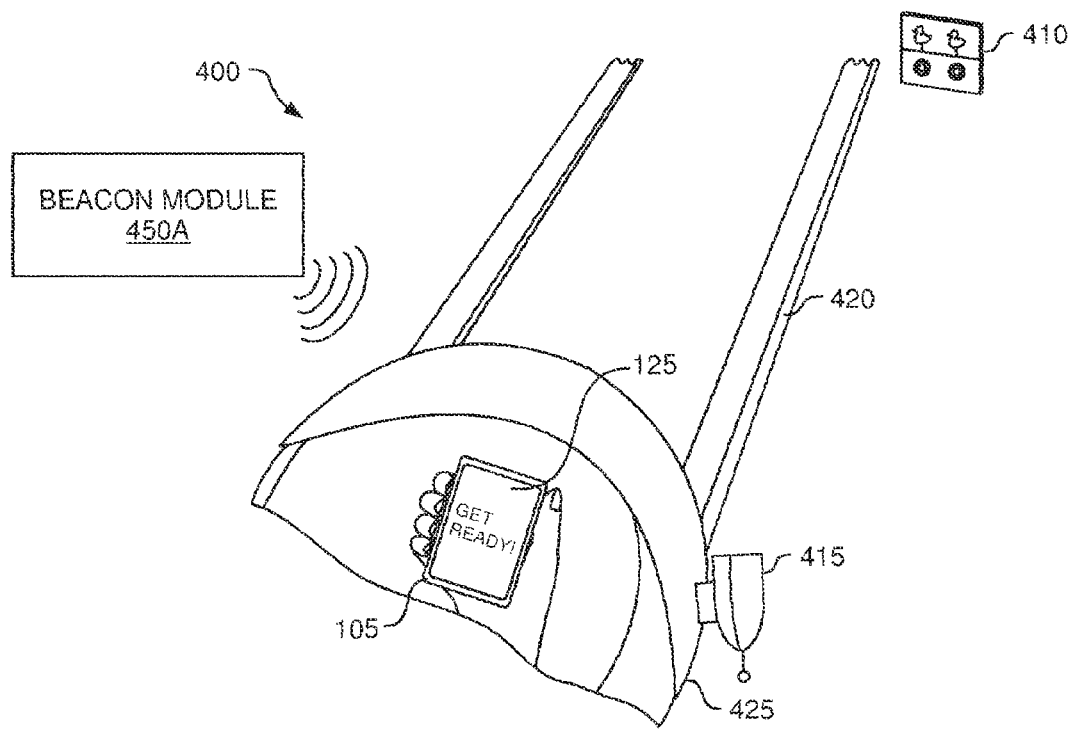
FIGS. 4A-4B illustrate communication systems with directional beacon modules, according to one embodiment described herein.
Figure 4B:
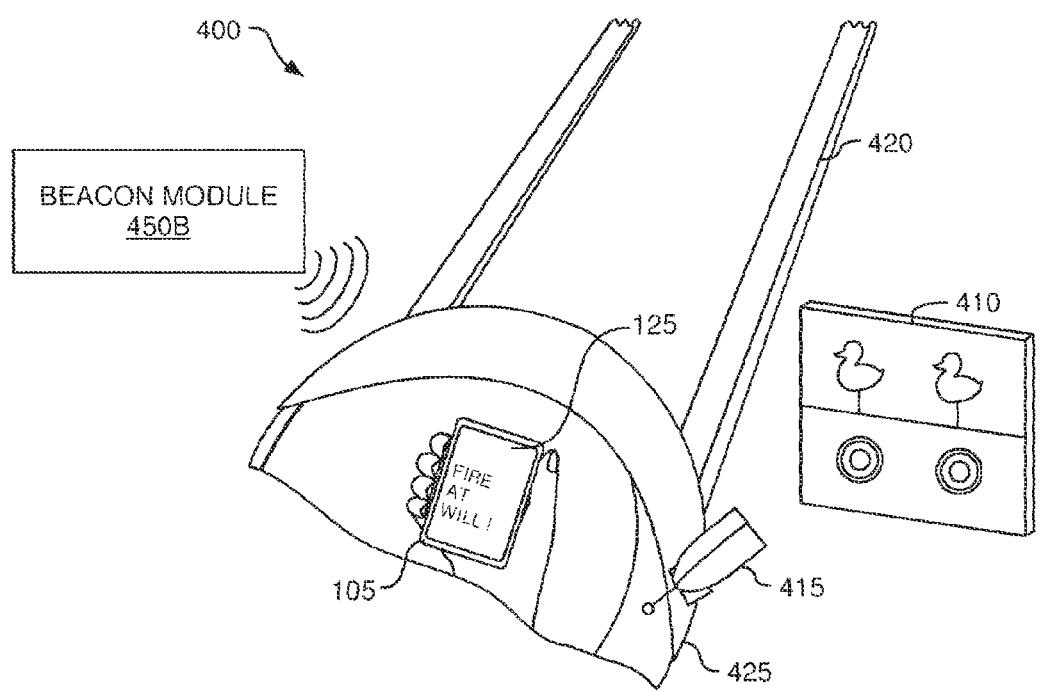

FIGS. 4A-4B illustrate a communication system 400 with directional beacon modules, according to one embodiment described herein. Specifically, FIG. 4A illustrates a location of the user in an amusement park ride at first time while FIG. 4B illustrates a location of the user in the amusement park ride at a second, subsequent time. As shown in FIG. 4A, the user is riding in a passenger vehicle 425 that uses the tracks 420. At the location shown in FIG. 4A, the user device 105 is within range of the beacon module 450A which is transmitting Bluetooth LE advertisements. As discussed above, these advertisements may contain a plurality of different beacons—e.g., D-beacons, iBeacons, or a combination thereof.

In one embodiment, the radiation pattern of the beacon module 450A is tightly controlled so that only user devices in a desired broadcast region receive the advertisements. For example, the shape, transmission technique, and/or the transmission power of the antenna may be controlled to result in a radiation pattern that covers only the desired broadcast region. In one embodiment, the radiation pattern is limited to less than a 20 degrees cone relative to an axis normal to a planar antenna. Given this tightly controlled radiation pattern, the user device receives the advertisements and triggers the content associated with the D-beacon when the vehicle 425 is at a fairly specific location along the tracks 420 (depending on the distance between the tracks 420 and the beacon modules 450A). By being able to control the radiation pattern with this granularity, the D-beacon inside the advertisement can provide the beacon application on the user device 105 with a precise location of the user device 105 within the amusement park ride.

In the non-limited example shown in FIG. 4A, the beacon application uses the location information contained in the D-beacon received from the beacon module 450A to alert the user on an upcoming shooting gallery 410 where the user can use the laser device 415 to hit targets. Using the display 125, the beacon application provides the alert "GET READY!" to the user. In response, the user can look ahead and see that the shooting gallery 410 is approaching.

At FIG. 4B, the vehicle 425 has moved along the track 420 until it has reached the shooting gallery 410. Moreover, the user device 105 is now in range of the beacon module 450B which transmits a different advertisement and D-beacon than beacon module 450A. For example, the location information in the D-beacon emitted by beacon module 450B lets the beacon application know the user device 105 has reached the shooting gallery 410, and as such, the application uses the display 125 to tell the user she may begin using the laser device 415 to hit the targets. For instance, the D-beacon emitted by beacon module 450A may inform the beacon application that the user device is at Track Location M while the D-beacon emitted by beacon module 450B informs the beacon application the device is now located at Track Location N. The beacon application is preconfigured to provide the different visual presentations based on knowing the current location on the track 420. Moreover, in one embodiment, the radiation patterns of the beacon modules 450A and 450B do not overlap, or are substantially attenuated, in a region of the track 420 where the vehicle 425 passes. This reduces the likelihood that the application executing on the user device 105 will receive the two different D-beacons and attempt to trigger the presentation corresponding to two D-beacons simultaneously. Stated differently, the radiation patterns may be configured such that the wireless signals carrying the advertisements are substantially attenuated by the time the signals reach broadcast regions assigned to different beacon modules.

In one embodiment, the a beacon module 450 may include an antenna that provides a 33 to 18 degree cone with 10 dB attenuation within 6 feet from an object that is located 15 feet from the beacon module 450. In this scenario, if the beacon modules are 15 feet from the track 420, the beacon modules 450 can establish a broadcast region along 12 feet of the track 420. In this broadcast region, the user device 105 will receive the advertisements emitted by the beacon modules 450. Another beacon module 450 may then be configured to broadcast an advertisement for the next 12 feet of the track, or the next portion of track may be dead space the user device is not supposed to receive any advertisements.

In one embodiment, the user device 105 uses thresholds to determine when it is within a broadcast region assigned to a beacon module 450 and should therefore output a presentation corresponding to the received D-beacon. For example, if the signal strength is greater than 45 dB, then the user device 105 determines it is within the broadcast region of a beacon module 450 and begins to decode the beacons in the received advertisement. As such, the user device 105 may receive multiple D-beacons from multiple beacon modules 450 simultaneously, but trigger only the presentation corresponding to the D-beacon that has a signal strength greater than 45 dB. One problem with this approach is that an engineer may need to test the locations within the broadcast region to set the threshold. For example, if the desired broadcast region is the 12 feet of track 420 directly in front of the beacon module 450A, then the engineer may determine what the signal strength is at the boundaries of the region which then tells the engineer how to program the threshold used by the beacon application. For example, if the signal strength 7 feet away from the center of the broadcast region is 43 dB and the signal strength 6 feet away from the center is 46 dB, then the engineer can set the threshold somewhere between these signal strengths.

Alternatively or additionally, the beacon application can use a change in signal strength to determine when the user device 105 has entered the broadcast region assigned to a beacon module. The beacon application in the user device 105 may monitor the signal strengths of the received D-beacons. If the application detects an increase in signal strength by 10 dB for a particular D-beacon, then the application determines it is within a broadcast region and outputs the corresponding presentation. In one embodiment, the application determines an change signal strength within a pre-defined time period. For example, the beacon application may compare a running average or an average of a plurality of sequential samples to determine if the signal strength has increased by the predetermined change within a set time period.

Figure 5A:
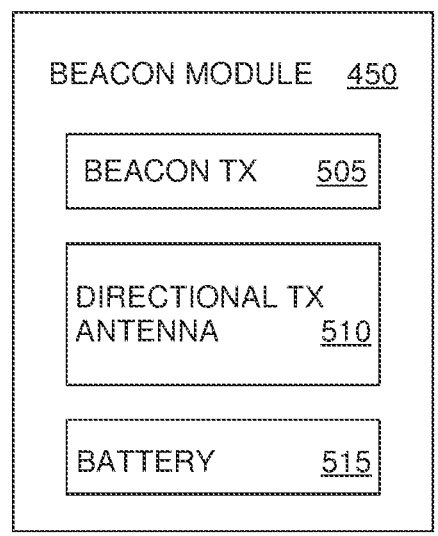
FIGS. 5A-5B are block diagrams of a directional beacon module, according to one embodiment described herein.

FIG. 5A is a block diagram of a directional beacon module 450, according to one embodiment described herein. As shown, the beacon module 450 includes only a beacon transmitter 505, and as such, the beacon module 450 only transmits the Bluetooth LE advertisements using the directional transmitter antenna 510 and does not receive beacons or advertisements from the user device. Furthermore, the beacon module 450 uses a battery 515 as a power supply which may increase the locations where the modules 450 can be located. That is, the beacon module 450 may be placed in a location where an external power source (e.g., a power grid) are unavailable or where using extension cords would be dangerous (e.g., near water). In one example, the beacon module 450 may be mobile, and thus, able to be carried either on a mobile vehicle or on a person's body. For instance, the beacon module 450 may be placed on an ice cream truck that offers deals to whoever is within range. Or the module 450 may be carried by a costumed character as she walks around a theme park so that visitors waiting to take pictures of the character can, for example, watch a special program or play a game associated with character as they wait. In one embodiment, the beacon module 450 does not perform wired or wireless communication with any external device except for transmitting the advertisements to the user devices 105 that enter into its assigned broadcast region.

Furthermore, the beacon modules 450 may include a connectable state and a non-connectable state. In the connectable state, an engineer can connect to the beacon module 450 to update or program the software or firmware in the module 450. To switch between the connectable and non-connectable states, an enclosure of the beacon modules 450 may include a state-switch button that activates the connectable state for a predetermined time limit. To prevent unauthorized personnel from activating the state-switch button, the beacon modules 450 may located either out of reach or hidden (e.g., in a podium or behind a wall). Once in the connectable state, the engineer has the predefined time period to update the beacon module 450 such as change the information contained in the beacon, modify the software attenuation of the antenna, change to a dual-mode where both D-beacons and OS specific beacons are transmitted in the advertisements, etc.

Figure 5B:
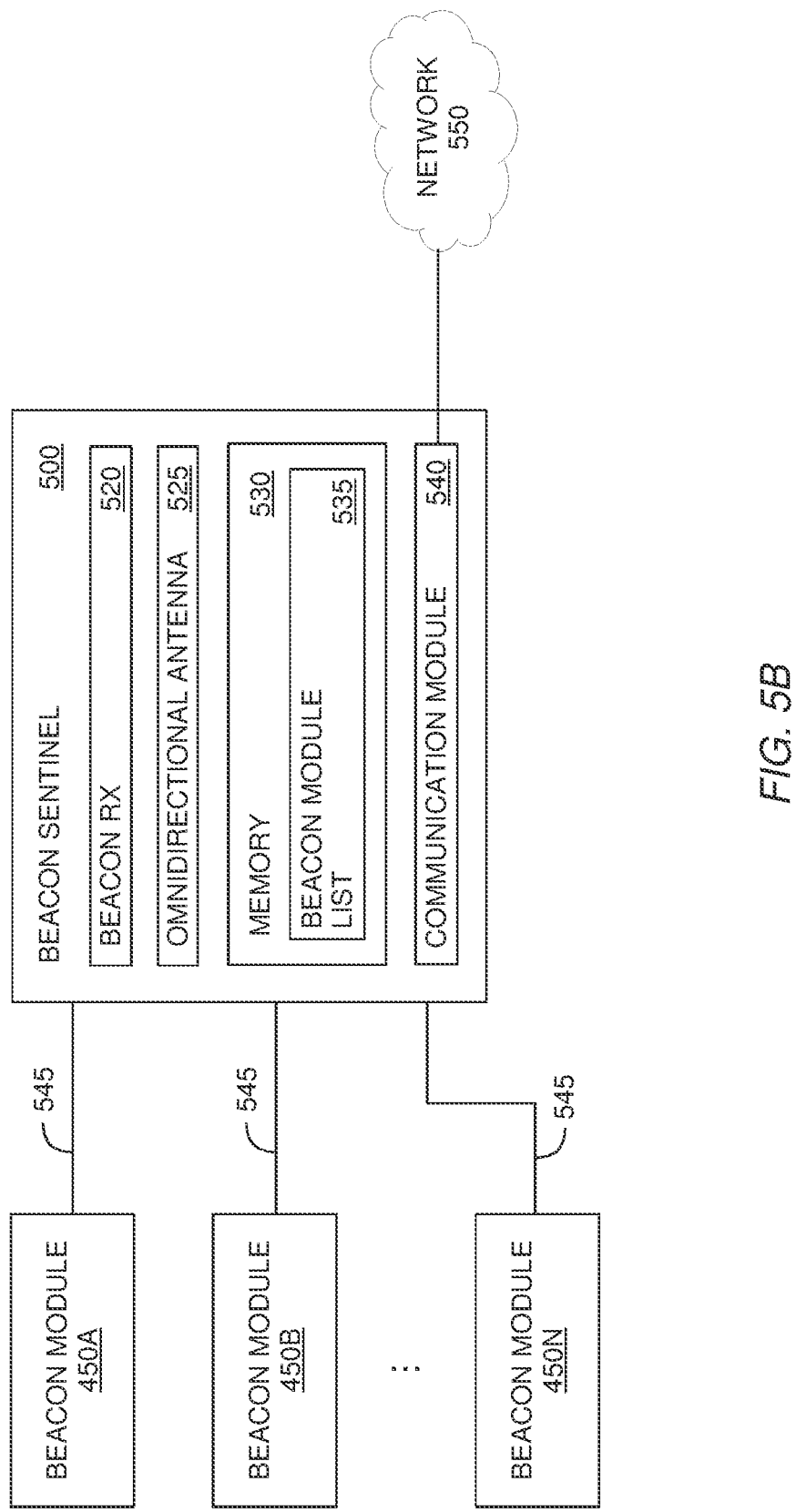

FIG. 5B is a block diagram of a beacon system, according to one embodiment described herein. Here, a beacon sentinel 500 is placed within communication range of the beacon modules 450. As described above, the modules 450 have radiation patterns that establish defined broadcast regions. When a user device enters the broadcast region, the beacon application outputs the corresponding presentation. The beacon sentinel 500, however, may be outside of the beacon regions for at least one of the beacon modules 450 but still within the radiation pattern of the transmitters in the beacon modules 450. That is, the radiation patterns of the beacon modules 450 cause the D-beacons (which are transmitted using radio waves) to propagate beyond the assigned broadcast regions which are used to trigger content on the user device. As such, the beacon sentinel 500 may be located outside of the broadcast regions and still receive the D-beacons from each of the beacon modules 450 shown in FIG. 5B as shown by the communication paths 545.

For example, the beacon modules 450A-450N may be beacon modules placed within a particular building or geographic region. The beacon sentinel 500 may be disposed at a central location in the building or geographic region such that the sentinel 500 is able to receive the D-beacons transmitted by each of the beacon modules 450 via the communication paths 545. To do so, the sentinel 500 includes a beacon receiver 520 and an omni-directional antenna 525. The antenna 525 may be larger than the antennas used in the beacon module 450 in order to increase the ability of the beacon sentinel 500 to detect the transmitted D-beacons despite the fact the sentinel 500 may be located outside the broadcast regions of the beacon modules 450.

The beacon sentinel 500 includes memory 530 which may include volatile memory, non-volatile memory, or combinations thereof. Using memory 530, the beacon sentinel 500 maintains a beacon module list 535 that is updated based on the D-beacons received from the beacon modules 450. As described above, the beacon modules 450 may operate using battery power and may not have the ability to communicate information to an external device except by transmitting the D-beacons. As such, the beacon modules 450 are not able to use, for example, the Internet to send out reports of battery life or to transmit a service alert when a component in the module 450 malfunctions. To detect a failure, an engineer would need to be within the radiation pattern of the beacon module 450 to determine if a D-beacon is being transmitted. If not, the engineer could investigate the problem further (e.g., determine its battery is depleted or replace a malfunction component).

The beacon sentinel 500 obviates the need for an engineer to visit the beacon modules 450 to determine if they are functioning. Once operational, the beacon sentinel 500 begins to record the received D-beacons in the beacon module list 535 using, for example, ID information included in the preamble of the beacons or based on the unique data carried in the respective payloads of the beacons. Once identified, the sentinel 500 continues to monitor the D-beacons. For example, if the sentinel 500 stops receiving the D-beacons, the sentinel 500 uses communication module 540 to transmit a service alert via network 550 (e.g., the Internet) to an assigned engineer. Additionally or alternatively, if the beacon sentinel 500 determines based on historical data that the signal strength of the received D-beacon is decreasing at a certain rate or has dropped below a threshold, the sentinel 500 may transmit the service alert even if the sentinel 500 continues to receive the D-beacon since this may be an indicator that the battery on the corresponding beacon module 450 is almost depleted and will fail in the future. Doing so may aid in preventing "dead spots" in the beacon system.

Thus, instead of requiring the engineer to monitor the beacon modules 450, the beacon sentinel 500 performs this task to identify, and in some cases, prevent service outages. For example, an engineer may only have time to walk through a building to test the beacon modules 450 once a week or must rely on users to report a service outage. With the beacon sentinel 500, an outage can be detected immediately or even prevented. Moreover, the beacon sentinel 500 itself may be battery operated or have a power supply that receives external power from, e.g., a utility grid. Furthermore, the beacon sentinel 500 may also be used to monitor beacon modules 450 that also operate using external power rather than being battery operated as the ones shown here. For example, as will be described in embodiments below, a beacon module that uses external power may still not have the ability to issue reports on its status (e.g., does not have a connection to the network 550 for reporting service issues). Thus, the beacon sentinel 500 may be placed within the radiation pattern of these modules in order to transmit service alerts via network 550. For example, a beacon module may be unplugged from the utility grid, and in response, the beacon sentinel 500 can transmit a service alert to a service engineer.

In one embodiment, the beacon sentinel 500 includes logic for determining when a service alert should be issued. For example, the beacon sentinel 500 may include an application that, when detecting a D-beacon is no longer received, determines that the corresponding beacon module 450 has failed. Similarly, the application may monitor the signal strength and use an algorithm or compare the signal strength to a threshold to determine if the signal strength is caused by environmental changes (e.g., an object that attenuates the signal power of the D-beacon is placed between the sentinel 500 and the module 450) or is a indicator that the battery in the module 450 is about to fail. Conversely, in other embodiments, the beacon sentinel 500 send the current beacon module list 535 via a network 550 to an external computing device which determines whether to issue a service alert.

FIG. 6 illustrates a communication system 600 with a beacon module 650 communicatively coupled to a computing device 610, according to embodiments described herein. In this example, the system 600 may be within a theater that includes an audio/video presentation being presented on a screen 605. The radiation pattern of the beacon module 650 (or multiple beacon modules) may be configured to generate a broadcast region that covers the theater. When the user walks into the theater carrying the user device 105, the beacon application may be triggered based on the signal strength as discussed above. In the embodiment shown, the beacon application provides the user with subtitles that correspond to the a/v presentation on the screen 605. In order to do so, the beacon contains scene or time stamp information that enables the beacon application to identify the current scene of the a/v presentation. In this manner, the beacons synchronizes the beacon application with the presentation, even if the presentation has already begun playing before the user device 105 entered the broadcast region of the beacon module 650.

To generate the scene or time stamp information, the beacon module 650 is coupled to the computing device 610 that is external to the enclosure of the beacon module 650. The computing device 610 includes time codes 615 that represent the current location of the a/v presentation (e.g., 5 minutes and 33 seconds). Although the module 650 is shown as being physically coupled to the computing device 610 via a wired connection, the two components may also communicate using a wireless communication technique (e.g., Bluetooth or WiFi). Regardless of the technique used, the computing device 610 transmits time codes 615 to the beacon module 650 that then uses the time codes to generate the synchronization information which is embedded into the payloads of the beacons transmitted to the user device 105. Using this synchronization information, the beacon application can provide the corresponding subtitles to the user. In this example, in addition to communicating with the user device 105, the beacon module 650 also communicates with the computing device 610 in order to receive updated information regarding the user's environment.

FIG. 7 illustrates a beacon module 650 with a secondary communication system used to communicate with an external computing device, according to one embodiment described herein. The beacon module 650 includes a beacon transmitter 705 used to transmit the location and synchronization information described above to the user device using the transmit antenna 710. Here the module 650 includes a POE module 715 that may be coupled to the computing device 610 shown in FIG. 6. For example, an Ethernet cable may connect the beacon module 650 with the computing device 610 in which case, in addition to providing the time codes 615 (i.e., data signals), the computing device 610 also provides power signals on the cable to the POE module 715. In this case, the power supply of the computing device 610 which may be plugged into an outlet can be leveraged to power both computing device 610 and beacon module 650. Of course, in other embodiments, the beacon module 650 may be battery powered or have its own connection to a power outlet.

Figures 8, 9:
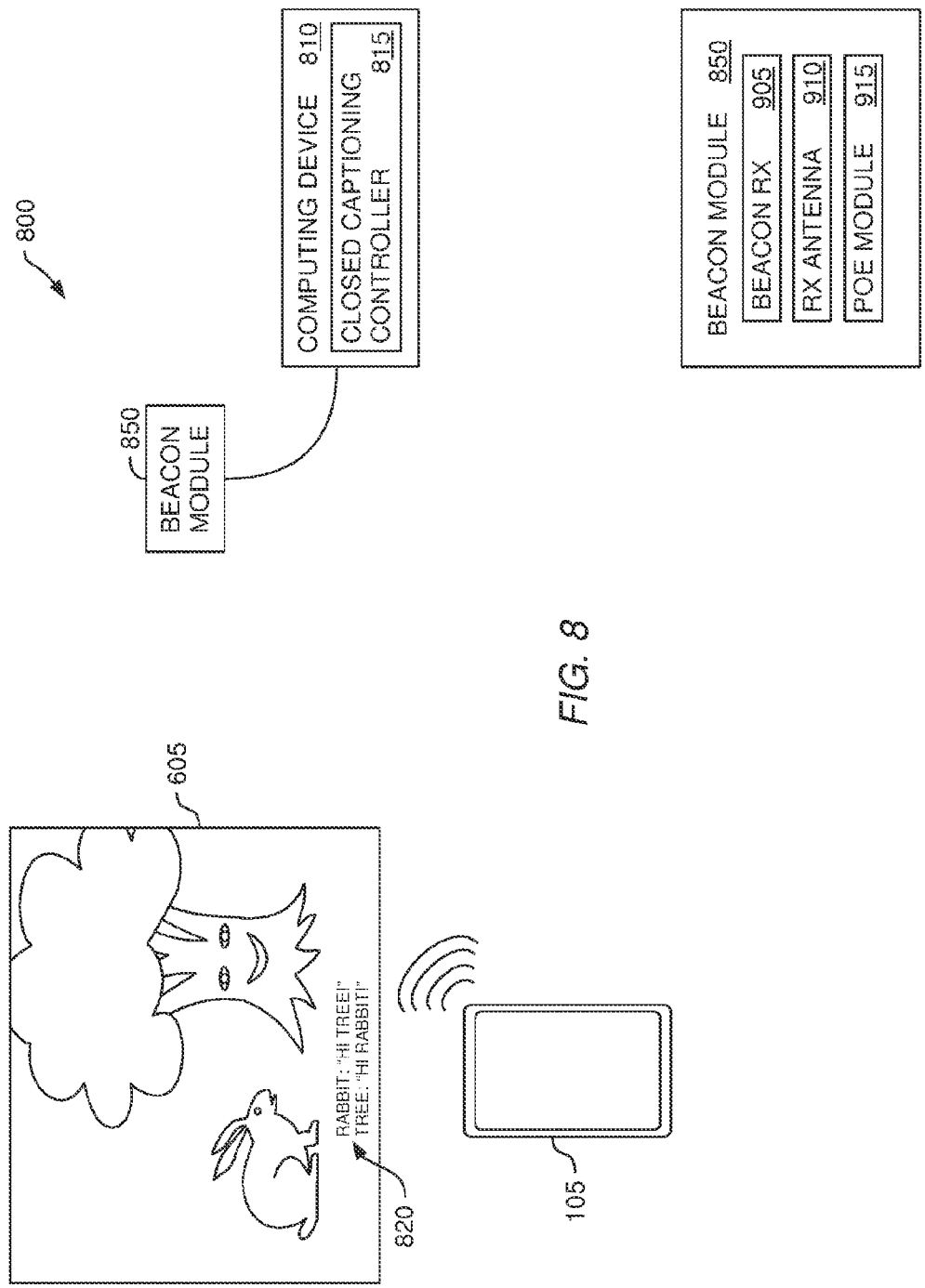
FIG. 8 illustrate a communication system with a passive beacon module, according to embodiments described herein.
FIG. 9 illustrates a passive beacon module with a secondary communication system used to communicate with an external computing device, according to one embodiment described herein.

FIG. 8 illustrate a communication system 800 with a passive beacon module 850, according to embodiments described herein. In system 800, the passive beacon module 850 does not transmit the Bluetooth LE advertisements, but instead receives advertisements from the user device 105. As such, unlike the beacon modules discussed in FIG. 4-7, here, the beacon module 850 is not assigned a broadcast region. Once the user device 105 comes into range of the beacon module 850, the beacon module decodes the received advertisement and uses the information in the advertisement to send an instruction to an external computing device 810.

In the embodiment shown, the user device 105 transmits an advertisement to the beacon module 850 which, in response, instructs closed captioning controller 815 to active the closed captioning 820 on the screen 605. For example, the user device may periodically, or upon a prompt from the user, transmit advertisements with D-beacons that include identification information of the user device 105 or a specialized instruction. For example, the payload of the D-beacon may include a code that the beacon module 850 interprets as a request to activate closed captioning. Thus, instead of the beacon application on the user device 105 containing the closed captioning data, the application only must have available the appropriate code that when received by the beacon module 850, activates the closed captioning on the screen 605.

Of course, closed captioning is just one example of how the user device 105 can activate a function in the system 800 using Bluetooth LE advertisements. In another example, the user device can transmit a beacon that informs the beacon module 850 and computing device 810 that it is the user's birthday. The computing device 810 may cause a happy birthday message to appear on the screen 605.

FIG. 9 illustrates the passive beacon module 850 with a secondary communication system used to communicate with an external computing device, according to one embodiment described herein. Specifically, the beacon module 850 includes a beacon receiver 905 which includes the logic necessary to decode advertisements received from the user device. Stated differently, the beacon receiver 905 is preconfigured with logic that can decode the data stored in the payload of the received D-beacons, and based on the decoded data, transmit instructions to the external computing device. The beacon module 850 also includes a receive antenna 910 which may be less complicated than a directional antenna since the passive beacon module 850 does not transmit advertisements. Moreover, the beacon module 850 includes a POE module 915 which may be used to transmit instructions to the external computing as well as receive power.

Although the beacon module 850 as shown has a passive beacon that does not transmit advertisements, in one embodiment, the beacon module 850 also transmits Bluetooth LE advertisements to the user device 105 as well as receives them. For example, the beacon module 850 may transmit location information to the user device 105 that the beacon application can use to provide a brief synopsis of the a/v presentation to the user. If the user desires, she may also use the user device 105 to send an advertisement to the beacon module 850 which turns on the closed captioning as discussed above.

Figure 10:
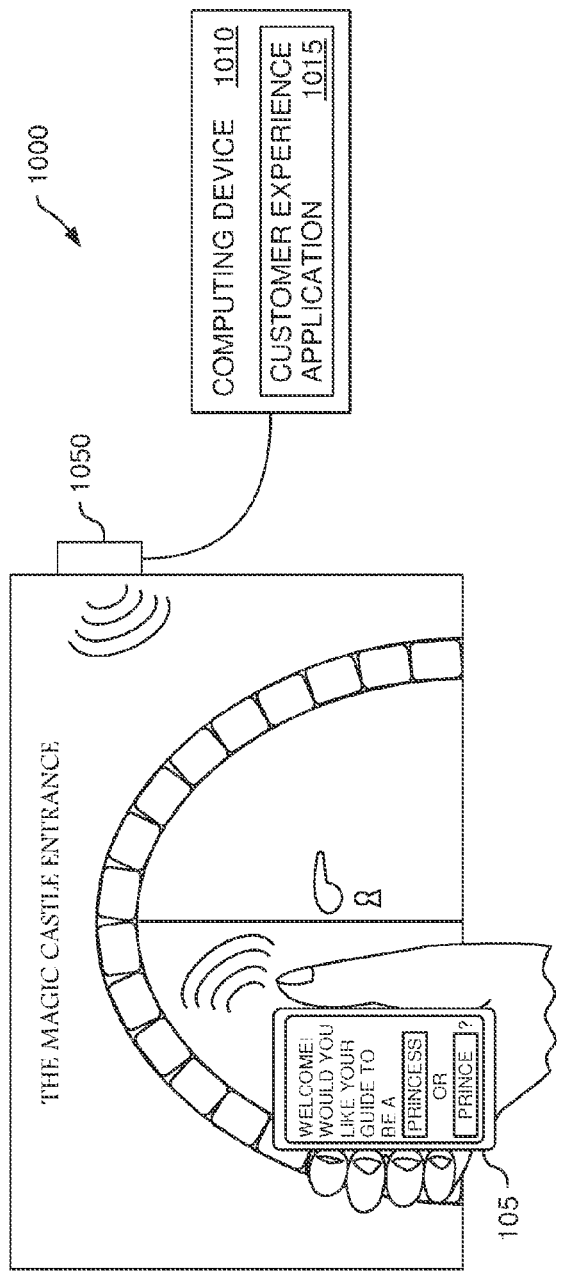
FIG. 10 illustrates a communication system with bidirectional communication between a user device and a beacon module, according to one embodiment described herein.

FIG. 10 illustrates a communication system 1000 with bidirectional communication between the user device 105 and beacon module 1050, according to one embodiment described herein. In one embodiment, the bidirectional communication may be in a particular order. For example, the beacon module 1050 may first transmit a beacon to the user device 105 that includes location information. Based on this information, the beacon application determines the user device 105 is at the entrance of the Magic Castle and presents the user with a question such as whether the user would prefer a princess or a prince to be her guide when inside the Magic Castle. The user could then select one of the choices which prompts the beacon application to transmit a beacon back to the beacon module 1050. For example, this beacon may include an ID of the user device 105 as well as the user's choice. The beacon module 1050 then forwards the user's choice to the computing device 1010 that contains an customer experience application 1015 that can customize the user's experience inside the Magic Castle—e.g., present a hologram of either a princess or a prince as the user travels around the castle. In this manner, the beacon module 1050 can transmit an advertisement to the user device 105, and in response, the beacon application transmits another advertisement to the beacon module 1050.

In one embodiment, instead of the user device 105 transmitting the user's choice using a Bluetooth LE advertisement, the device 105 may use a different communication method such as WiFi to transmit the user's choice to the customer experience application 1015. For example, the user device 105 and computing device 1010 may both have connections to a common network (e.g., the Internet) which they can use to transmit and receive the user's choice.

Figure 11:
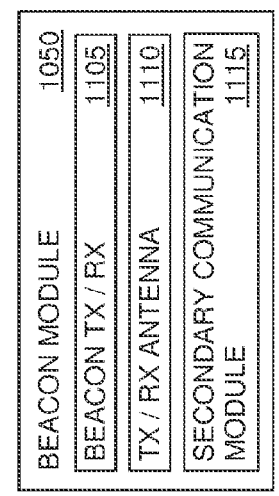
FIG. 11 illustrates a beacon module supporting bidirectional communication with a user device, according to one embodiment described herein.

FIG. 11 illustrates the beacon module 1050 supporting bidirectional communication with the user device 105, according to one embodiment described herein. The beacon module 1050 includes a beacon transceiver 1105 and transmit/receive antenna 1110 that permits the beacon module 1050 to both transmit and receive advertisements. As discussed above, the radiation pattern of the antenna may be controlled in order to establish a desired broadcast region so that accurate location information is provided to the user device. The beacon module 1050 also includes a secondary communication module 1111 such as a network module, PCI connection, wireless card, and the like which permits the beacon module 1050 to communicate with the external computing device.

Figure 12:
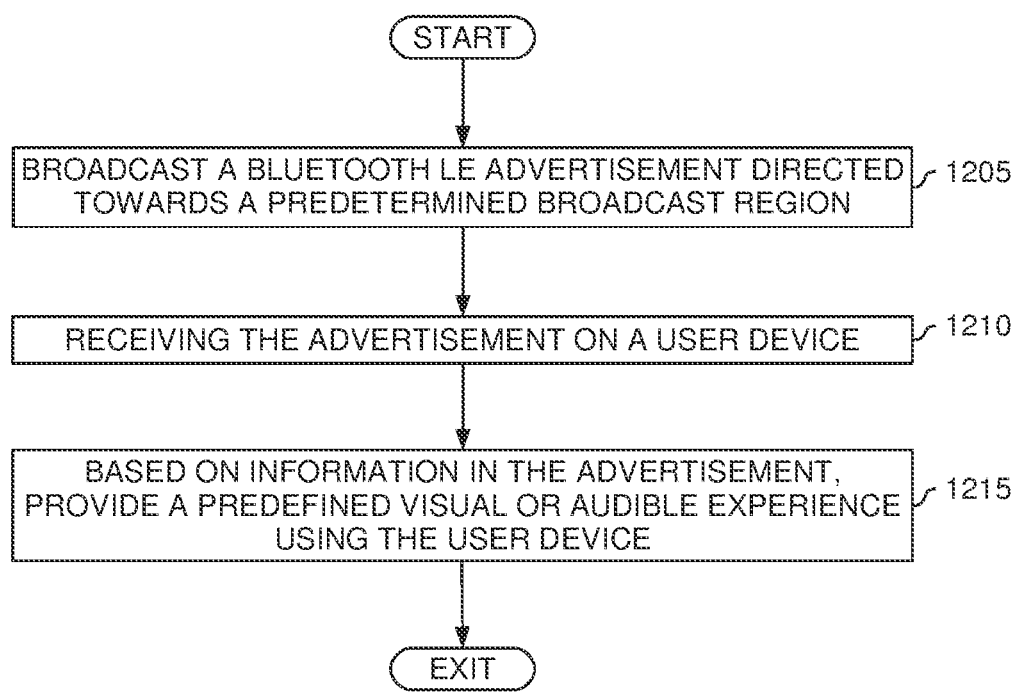
FIG. 12 is a method for using Bluetooth LE advertisements to trigger an audio and/or visual presentation on a user device, according to one embodiment described herein.

FIG. 12 is a method 1200 for using Bluetooth LE advertisements to trigger an audio and/or visual presentation on a user device, according to one embodiment described herein. At block 1205, the beacon module transmits a Bluetooth LE advertisement in a predetermined broadcast region. To do so, the beacon module may include a directional antenna that focuses its radiation pattern to establish the broadcast region. As will be described later, the power of the antenna may also be attenuated in order to generate the desired broadcast region. Furthermore, the beacon application executing on the user device may use power thresholds or monitor changes in power in order to determine when it has entered in a broadcast region.

If the beacon application determines the user device has entered a broadcast region, at block 1210, the beacon application evaluates the received signal to identify an advertisement containing one or more beacons. The Bluetooth LE advertisement may contain only one beacon or multiple beacons. If the latter, the beacons may be all the same type or various types (e.g., D-beacons and OS specific beacons). In one embodiment, the beacons include identification information that informs the beacon application the type of beacon in the advertisement. Based on this information, the beacon application can identify the manner in which data is formatted in the beacon and decode the data contained in beacon's payload.

At block 1215, the beacon application uses the decoded data in the beacon to provide a predefined visual or audible experience using the user device. For example, the decoded data may include location information that informs the beacon application of the user device's current location. The beacon application is then preconfigured to present a certain audio or visual experience corresponding to that location. In another example, the decoded data may include a time stamp or time code that permits the beacon application to synchronize to a media presentation, animatronics show, live presentation with actors, and the like. Once synchronized, the beacon application can then provide the user with supplemental information such as subtitles, a game associated with the current scene, and the like.

In one embodiment, the transmission of the advertisement may be in reverse where instead of the beacon module transmitting the advertisement to the user device, the user device transmits the advertisement to the beacon module. In turn, the beacon module may transmit the information in the advertisement to an external computing device that customizes the physical environment based on the received advertisement. For example, the computing device may add subtitles to a movie currently being played in a room with the user device, or permit the user to select which experience she would like to have in area (e.g., a dark, scary castle or a bright, cheerful castle). Furthermore, the user may be able to use the advertisement to lock or unlock a hotel room door or prevent an amusement ride from spraying water if the user does not want to get wet.

Although not shown in method 1200, before the user device receives the D-beacons, the user may be asked to download and install the beacon application onto the device. That is, because the D-beacons format data differently than OS specific beacons, to decode Bluetooth LE advertisements containing D-beacons, the user device relies on the beacon application to decode and interpret the data contained in D-beacons. For example, a theme park operator may provide the beacon application to the user. Because the operator knows the format of the D-beacons used in the theme park, she can program the beacon application to recognize and decode the specific D-beacons. Thus, at block 1210 when the user device receives the advertisements, the beacon application is able to decode the D-beacons and instruct the user device to output a corresponding audio or visual experience at block 1215. Providing the beacon application (i.e., a software application) is different than in other ranging technologies such as infrared communication where the user may be given an IR enabled device when she enters the theme park. Instead, the user can download the beacon application onto her own personal device (assuming the device is Bluetooth LE enabled) without having to carry around a specialized device.

Figure 13:
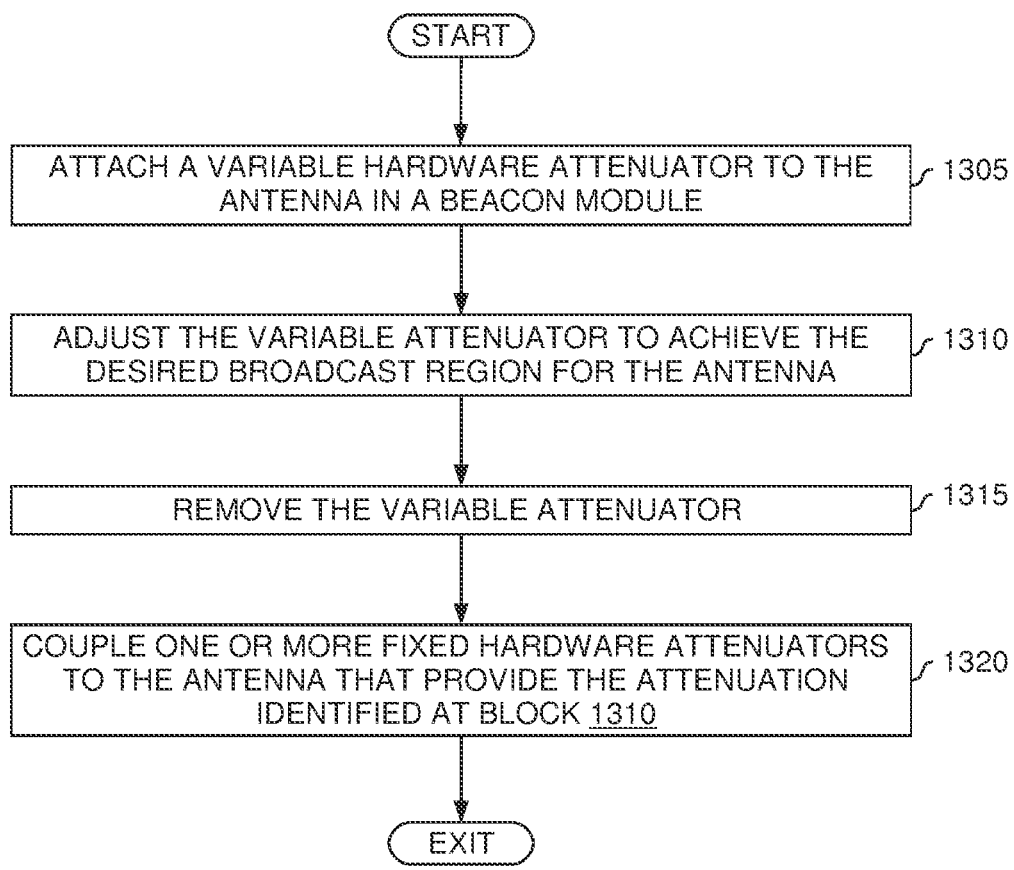
FIG. 13 is a method for establishing the broadcast region of a beacon module, according to one embodiment described herein.

FIG. 13 is a method 1300 for establishing the broadcast region of a beacon module, according to one embodiment described herein. At block 1305, a technician installs the beacon module at a location. Because Bluetooth LE signals can penetrate many types of walls, the beacon module does not necessarily need to be installed in the same room that includes the desired broadcast region of the beacon module. Once the beacon module is installed, the technician attaches a variable hardware attenuator to the antenna in the beacon module. Variable hardware attenuator allows the technician to precisely control the power emitted by the antenna. There are software attenuators that may be installed in the beacon transmitters, but these attenuators may not be reliable.

At block 1310, the technician adjusts the variable attenuator to achieve the desired broadcast region for the antenna. For example, the technician may use a device that tests signal strength to see if the signal transmitted by the antenna—i.e., the antenna's radiation pattern—covers the desired broadcast region. If not, the technician may reduce the attenuation on the variable attenuator—i.e., increase the signal strength by. Furthermore, the technician may also determine whether the signal strength is too high outside of the broadcast region. For instance, the technician may want the beacon module only to broadcast the advertisement within a specific room (another beacon module may be assigned to transmit an advertisement in an adjoining room). However, if the signal from the beacon module is bleeding into the adjoining room such that a user device in the adjoining room would receive the advertisement, the technician may increase the attenuation provided by the variable attenuator—i.e., decrease the signal strength.

Once the desired broadcast region is established, at block 1315, the technician removes the variable hardware attenuator from the beacon module and at block 1320 couples one or more fixed hardware attenuators to the antenna that provide the attenuation identified at block 1310. Variable hardware attenuators are relatively expensive compared to fixed hardware attenuators, and as such, it may reduce costs by using the variable attenuator to identify the proper signal attenuation and then replace the variable attenuator with a fixed attenuator. For example, if at block 1310, the technician set the variable attenuator to 15 dB to achieve the desired broadcast region, the technician may couple in series a 10 dB fixed hardware attenuator and a 5 dB fixed hardware attenuator to the antenna to generate the same 15 dB attenuation. The same variable attenuator is then available to configure the radiation pattern of another beacon module.

Figure 14:
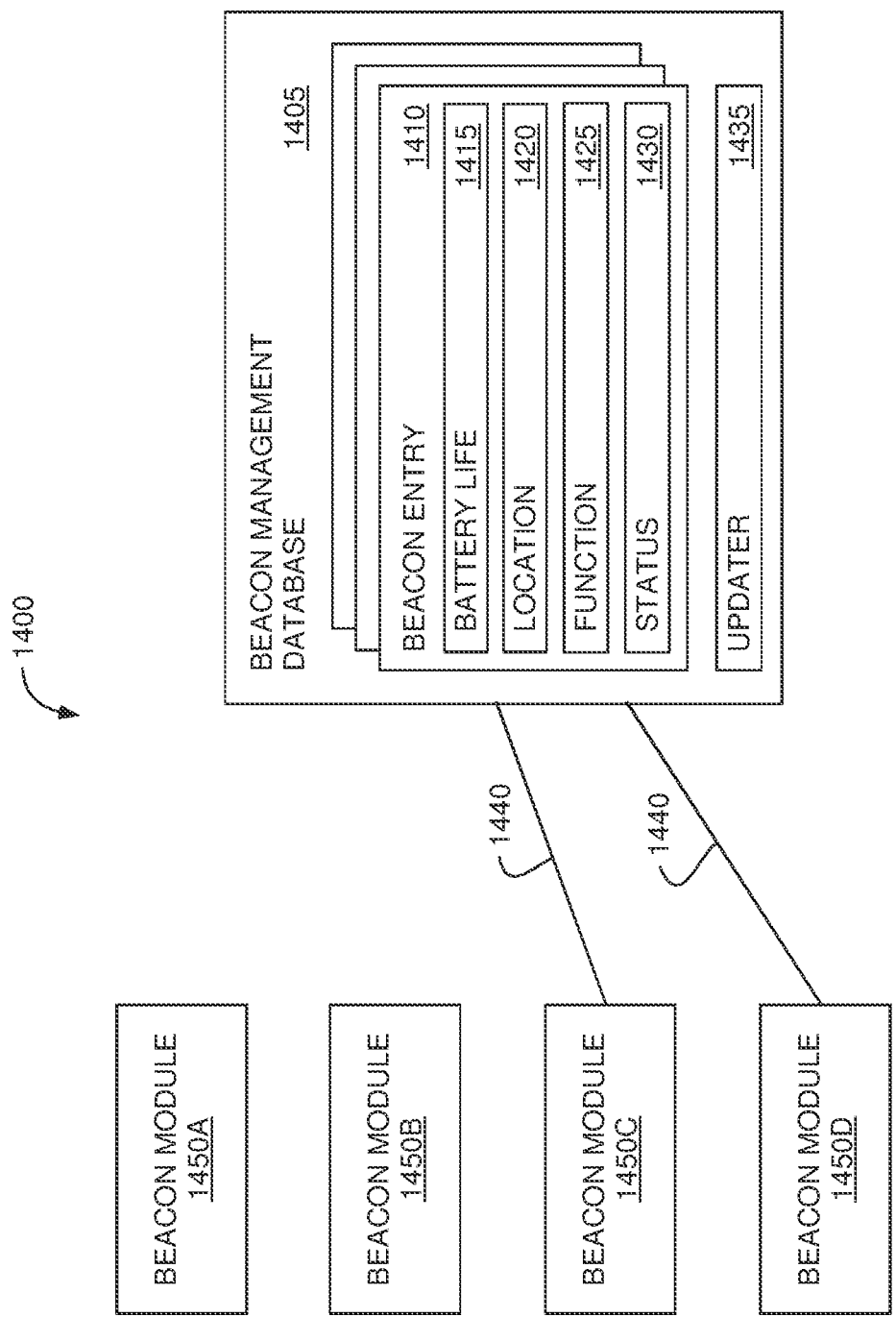
FIG. 14 is a block diagram of a system for managing a plurality of beacon modules, according to one embodiment described herein.

FIG. 14 is a block diagram of a system 1400 for managing a plurality of beacon modules 1450, according to one embodiment described herein. System 1400 includes a beacon management database 1405 which stores beacon entries 1450 corresponding to each beacon module 1450. For example, the database 1405 may manage all the beacon modules 1450 in a theme park, an office building, shopping mall, hotel, etc. The database 1405 may be stored on a hard drive, one or more servers, or even be part of a cloud service.

The beacon entries 1410 include a battery life entry 1415, location entry 1420, function entry 1425, and status entry 1430. The battery life entry 1415 may record the expected or measured remaining battery life of the corresponding beacon module 1450. In one example, the battery life entry 1415 stores the date when the beacon module 1450 was activated and the expected battery life of the particular battery used in the beacon module 1450. Moreover, in system 1400, some beacon modules 1450 have communication links 1440 with the beacon management database 1405 which the modules 1450 can use to send updated information to an updater 1435 in the database 1405. These communication links 1440 may use either wired or wireless communication techniques. The beacon modules 1450C and 1450D may include circuits that measure the remaining life of the batteries in these modules and report these statistics to the updater 1435 which in turn updates the battery life entry 1415 for these modules. Of course, because some of the beacon modules 1450 may not use batteries as power supplies, the corresponding beacon entries 1410 would not include the battery life entry 1415.

The location entry 1420 describes where in the system 1400 the beacon module is installed. For example, each time a technician installs or moves a beacon module 1450, she may send an instruction to the updater 1435 to change the location value 1420 to a new value. Similar to the location entry 1420, a technician may also provide the function or purpose of the beacon module 1450 to the updater 1435 which stores this information in the function entry 1425.

The value of the status entry 1430 may come directly from the beacon module 1450 if the module 1450 has a communication link 1440 to the database 1405. If not, then a service technician may update this value when, for example, a user reports one of the beacon modules 1450 is not functioning. Moreover, if the battery life has expired, then the updater 1435 may automatically change the status to indicate service is required. Based on the status entry 1430, a service technician may be dispatched to evaluate the condition of the beacon module 1450.

The different characteristics stored in the beacon entry 1410 are intended as non-limiting examples. Other embodiments may have more or less than the characteristics shown. For example, an entry 1410 may also store antenna type or hardware capabilities of the beacon modules 1450 so a service technician can easily determine if a beacon module may be used to perform a different or expanded function.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A communication system, comprising:
a beacon module comprising an antenna, a beacon receiver, and a beacon transmitter, the beacon transmitter is configured to transmit, via the antenna, a customized beacon comprising at least (i) a data field indicating a formatting used in a payload portion of the customized beacon and (ii) dynamic payload data in the payload portion comprising data that is relevant to a current context of the beacon module, wherein a value of the data field varies to indicate a type of the dynamic payload data included in the customized beacon,
wherein the beacon transmitter is configured to transmit the customized beacon using a communication protocol that transmits data at one or more radio frequencies greater than 1.5 GHz, wherein the communication protocol does not require pairing between the beacon transmitter and a user device receiving the customized beacon,
wherein the beacon receiver is configured to receive a communication packet from the user device, the communication packet including information for changing a user experience, and wherein the beacon module is further configured to transmit a data message to an external computing device, the data message instructing the external computing device to change the user experience at a geographical location of the user device based on the information contained in the communication packet; and an application configured to execute on the user device, the application is configured to receive the customized beacon and instruct the user device to output a presentation based on the dynamic payload data.

2. The communication system of claim 1, wherein the beacon transmitter is configured to transmit the customized beacon and an operating system (OS) specific beacon, wherein a formatting of the data contained in the OS specific beacon is recognizable by an OS executing on the user device.

3. The communication system of claim 2, wherein at least one of the customized beacon and the OS specific beacon include location information identifying a geographic location of the user device.

4. The communication system of claim 1, wherein the payload portion of the customized beacon includes information that at least one of identifies a geographic location of the user device and synchronizes the user device with a presentation occurring at the geographic location.

5. The communication system of claim 1, wherein the current context is determined by one or more factors selected from: time of day, time of year, location, events occurring in a vicinity of the beacon module, merchandise or marketing promotions, holidays, languages spoken in the vicinity of the beacon module, food and beverage menu offerings, immersive entertainment offerings, game scores and content, timing or scene of a theatrical show, film or ride.

6. The communication system of claim 1, the beacon module further comprises:

an attenuator configured to limit a radiation pattern of the antenna to a predefined broadcast region, wherein the application is configured to output the presentation upon determining the user device is within the broadcast region.

7. The communication system of claim 1, wherein the data field indicates a type of the customized beacon selected from a plurality of predefined customized beacon types, and wherein the communication protocol is Bluetooth low-energy (LE).

8. A beacon module, comprising:

an antenna;

a beacon receiver; and a beacon transmitter configured to transmit, via the antenna, a customized beacon to an external application, the customized beacon comprising at least (i) a data field indicating a formatting used in a payload portion of the customized and (ii) dynamic payload data in the payload portion comprising data that is relevant to a current context of the beacon module, wherein a value of the data field varies to indicate a type of the dynamic payload data included in the customized beacon, wherein the beacon transmitter is configured to transmit the customized beacon using a communication protocol that transmits data at one or more radio frequencies greater than 1.5 GHz, wherein the communication protocol does not require pairing between the beacon transmitter and a user device receiving the customized beacon, wherein the beacon receiver is configured to receive a communication packet from the user device, the communication packet including information for changing a user experience, and wherein the beacon module is further configured to transmit a data message to an external computing device, the data message instructing the external computing device to change the user experience at a geographical location of the user device based on the information contained in the communication packet.

9. The beacon module of claim 8, wherein the beacon transmitter is configured to transmit the customized beacon and an OS specific beacon, wherein a formatting of the data contained in the OS specific beacon is recognizable by an OS executing on the user device.

10. The beacon module of claim 8, wherein the payload portion of the customized beacon includes information that at least one of identifies a geographic location of the user device and synchronizes the user device with a presentation occurring in at the geographic location.

11. The beacon module of claim 8, further comprising:

an attenuator configured to limit a radiation pattern of the antenna to a predefined broadcast region, wherein the external application outputs a presentation based on the dynamic payload data upon determining the external application is within the broadcast region.

12. The beacon module of claim 8, further comprising a battery, wherein the beacon module does not receive external power and does not receive data signals from any external source, wherein the communication protocol is Bluetooth LE.

13. The beacon module of claim 8, further comprising a secondary communication module configured to at least one of transmit data to and receive data from the external computing device to an enclosure containing the beacon module, wherein the secondary communication module is configured to use a communication technique different than the communication protocol to communicate with the external computing device.

14. A method, comprising:

generating a customized beacon comprising at least (i) a data field indicating a formatting used in a payload portion of the customized beacon and (ii) dynamic payload data in the payload portion comprising data that is relevant to a current context of a beacon module, wherein a value of the data field varies to indicate a type of the dynamic payload data included in the customized beacon;

broadcasting the customized beacon to a user device executing an application using a communication protocol that transmits data at one or more radio frequencies greater than 1.5 GHz, wherein the communication protocol does not require pairing between a beacon transmitter and the user device;

receiving a communication packet from the application executing on the user device, the communication packet including information for changing a user experience; and transmitting a data message to an external computing device, the data message instructing the external computing device to change the user experience at a geographical location of the user device based on the information contained in the communication packet.

15. The method of claim 14, further comprises:

generating an OS specific beacon, wherein a formatting of the data contained in the OS specific beacon is recognizable by an OS executing on the user device.

16. The method of claim 15, wherein at least one of the customized beacon and the OS specific beacon include location information identifying a geographic location of the user device.

17. The method of claim 14, wherein the payload portion of the customized beacon includes information that at least one of identifies a geographic location of the user device and synchronizes the user device with a presentation occurring in at the geographic location.

18. The method of claim 14,
wherein the communication packet is received from a receiving device via Bluetooth LE, the communication packet including information for changing the user experience at the geographical location of the user device.

19. The method of claim 18,
wherein the data message is transmitted using a communication technique different from the communication protocol.

20. The method of claim 14, wherein the data field indicates a type of the customized beacon selected from a plurality of predefined customized beacon types, and wherein the communication protocol is Bluetooth LE.

21. A communication system, comprising:
a beacon module comprising an antenna, a beacon receiver, and beacon transmitter, the beacon transmitter is configured to transmit, via the antenna, a Bluetooth LE advertisement containing a customized beacon, the customized beacon comprising at least (i) a data field indicating a formatting used in a payload portion of the customized beacon and (ii) dynamic payload data in the payload portion comprising data that is relevant to a current context of the beacon module, wherein a value of the data field varies to indicate a type of the dynamic payload data included in the customized beacon; and
an application configured to execute on a user device, the application is configured to receive the Bluetooth LE advertisement and instruct the user device to output a presentation based on the dynamic payload data,
wherein the beacon receiver is configured to receive a communication packet from the user device via Bluetooth LE, the communication packet including information for changing a user experience, and wherein the beacon module is further configured to transmit a data message to an external computing device, the data message instructing the external computing device to change the user experience at a geographical location of the user device based on the information contained in the communication packet.

\* \* \* \* \*